(12) United States Patent
Plante

(10) Patent No.: US 8,374,746 B2
(45) Date of Patent: Feb. 12, 2013

(54) MEMORY MANAGEMENT IN EVENT RECORDING SYSTEMS

(75) Inventor: James Plante, San Diego, CA (US)

(73) Assignee: Smartdrive Systems, Inc., San Diego, CA (US)

( * ) Notice: Subject to any disclaimer, the term of this patent is extended or adjusted under 35 U.S.C. 154(b) by 902 days.

(21) Appl. No.: 12/096,592

(22) PCT Filed: Dec. 7, 2006

(86) PCT No.: PCT/US2006/047055
§ 371 (c)(1),
(2), (4) Date: Oct. 3, 2008

(87) PCT Pub. No.: WO2007/067775
PCT Pub. Date: Jun. 14, 2007

(65) Prior Publication Data
US 2009/0222163 A1  Sep. 3, 2009

Related U.S. Application Data

(63) Continuation of application No. 11/296,907, filed on Dec. 8, 2005, now abandoned.

(51) Int. Cl.
*G06F 7/00* (2006.01)
(52) U.S. Cl. ............. 701/32.2; 701/33.3; 701/33.4; 701/115
(58) Field of Classification Search ............. 701/35, 701/50, 32.2, 33.3, 33.4, 115; 711/147, 5; 345/531–538, 545, 546, 547; 710/56, 53; 375/372; 348/567, 231.1
See application file for complete search history.

(56) References Cited

U.S. PATENT DOCUMENTS

| 4,281,354 A | 7/1981 | Conte |
| 4,843,463 A | 6/1989 | Michetti |
| 5,140,436 A | 8/1992 | Blessinger |
| 5,497,419 A | 3/1996 | Hill |
| 5,513,011 A | 4/1996 | Matsumoto et al. |
| 5,570,127 A | 10/1996 | Schmidt |
| 5,586,130 A | 12/1996 | Doyle |

(Continued)

FOREIGN PATENT DOCUMENTS

| CA | 2 469 728 A1 | 12/2005 |
| DE | 202 005008238 U | 9/2005 |

(Continued)

OTHER PUBLICATIONS

International Search Report for PCT/US2006/47055, Mailed Mar. 20, 2008 (2 pages).

(Continued)

*Primary Examiner* — Khoi Tran
*Assistant Examiner* — Jorge Peche
(74) *Attorney, Agent, or Firm* — Jones Day; Peter Thurlow; Jaime D. Choi

(57) ABSTRACT

A vehicle event recorder is provided that includes a camera for capturing a video as discrete image frames, and that further includes a managed loop memory and a management system for generating a virtual 'timeline dilation' effect. To overcome size limits in the buffer memory of the video event recorder, the maximum time extension of a video series is increased by enabling a reduction in temporal resolution in exchange for an increase in the temporal extension. Memory cells are overwritten in an 'interleaved' fashion to produce a reduced frame rate for the recording of certain time periods connected to an event moment. In time periods furthest from the event moment, the resulting frame rate is minimized while in time periods closest to the event moment, the resulting frame rate is maximized.

16 Claims, 11 Drawing Sheets

U.S. PATENT DOCUMENTS

| | | | | |
|---|---|---|---|---|
| 5,680,123 | A | 10/1997 | Lee | |
| 5,793,985 | A * | 8/1998 | Natarajan et al. | 709/247 |
| 5,815,071 | A | 9/1998 | Doyle | |
| 5,815,093 | A | 9/1998 | Kikinis | |
| 6,002,326 | A | 12/1999 | Turner | |
| 6,060,989 | A | 5/2000 | Gehlot | |
| 6,088,635 | A | 7/2000 | Cox et al. | |
| 6,092,008 | A | 7/2000 | Bateman | |
| 6,141,611 | A | 10/2000 | Mackey et al. | |
| 6,163,338 | A | 12/2000 | Johnson et al. | |
| 6,185,490 | B1 | 2/2001 | Ferguson | |
| 6,246,933 | B1 | 6/2001 | Bague | |
| 6,298,290 | B1 | 10/2001 | Abe et al. | |
| 6,333,759 | B1 | 12/2001 | Mazzilli | |
| 6,349,250 | B1 | 2/2002 | Hart et al. | |
| 6,389,339 | B1 | 5/2002 | Just | |
| 6,389,340 | B1 | 5/2002 | Rayner | |
| 6,405,112 | B1 | 6/2002 | Rayner | |
| 6,411,874 | B2 | 6/2002 | Morgan et al. | |
| 6,421,080 | B1 | 7/2002 | Lambert | |
| 6,449,540 | B1 | 9/2002 | Rayner | |
| 6,472,771 | B1 | 10/2002 | Frese et al. | |
| 6,507,838 | B1 | 1/2003 | Syeda-Mahmood | |
| 6,516,256 | B1 | 2/2003 | Hartmann et al. | |
| 6,518,881 | B2 | 2/2003 | Monroe | |
| 6,535,804 | B1 | 3/2003 | Chun | |
| 6,556,905 | B1 | 4/2003 | Mittelsteadt et al. | |
| 6,611,740 | B2 | 8/2003 | Lowrey et al. | |
| 6,624,611 | B2 * | 9/2003 | Kirmuss | 320/104 |
| 6,629,030 | B2 | 9/2003 | Klausner et al. | |
| 6,684,137 | B2 | 1/2004 | Takagi et al. | |
| 6,718,239 | B2 | 4/2004 | Rayner | |
| 6,721,640 | B2 | 4/2004 | Glenn et al. | |
| 6,728,612 | B1 | 4/2004 | Carver et al. | |
| 6,732,031 | B1 | 5/2004 | Lightner et al. | |
| 6,732,032 | B1 | 5/2004 | Banet et al. | |
| 6,735,503 | B2 | 5/2004 | Ames | |
| 6,737,954 | B2 | 5/2004 | Chainer et al. | |
| 6,739,078 | B2 | 5/2004 | Morley et al. | |
| 6,760,757 | B1 | 7/2004 | Lundberg et al. | |
| 6,795,111 | B1 | 9/2004 | Mazzilli | |
| 6,810,362 | B2 | 10/2004 | Adachi et al. | |
| 6,812,831 | B2 | 11/2004 | Ikeda | |
| 6,819,989 | B2 | 11/2004 | Maeda et al. | |
| 6,831,556 | B1 | 12/2004 | Boykin | |
| 6,832,141 | B2 | 12/2004 | Skeen et al. | |
| 6,836,712 | B2 | 12/2004 | Nishina | |
| 6,842,762 | B2 | 1/2005 | Raithel et al. | |
| 6,850,823 | B2 | 2/2005 | Eun et al. | |
| 6,859,695 | B2 | 2/2005 | Klausner | |
| 6,865,457 | B1 | 3/2005 | Mittelsteadt et al. | |
| 6,898,492 | B2 | 5/2005 | de Leon et al. | |
| 6,919,823 | B1 | 7/2005 | Lock | |
| 6,928,348 | B1 | 8/2005 | Lightner et al. | |
| 6,947,817 | B2 | 9/2005 | Diem | |
| 6,950,122 | B1 | 9/2005 | Mirabile | |
| 6,954,223 | B2 * | 10/2005 | Miyazawa et al. | 348/51 |
| 7,020,548 | B2 | 3/2006 | Saito et al. | |
| 7,082,359 | B2 | 7/2006 | Breed | |
| 7,100,190 | B2 | 8/2006 | Johnson | |
| 7,386,376 | B2 | 6/2008 | Basir | |
| 7,457,693 | B2 | 11/2008 | Olsen et al. | |
| 7,768,548 | B2 | 8/2010 | Silvernail et al. | |
| 2001/0005217 | A1 | 6/2001 | Hamilton et al. | |
| 2002/0091473 | A1 | 7/2002 | Garner et al. | |
| 2002/0105438 | A1 | 8/2002 | Forbes et al. | |
| 2002/0111725 | A1 | 8/2002 | Burge | |
| 2002/0118206 | A1 * | 8/2002 | Knittel | 345/557 |
| 2002/0135679 | A1 | 9/2002 | Scaman | |
| 2002/0169530 | A1 | 11/2002 | Laguer-Diaz et al. | |
| 2002/0183905 | A1 | 12/2002 | Maeda et al. | |
| 2003/0028298 | A1 | 2/2003 | Macky et al. | |
| 2003/0065805 | A1 * | 4/2003 | Barnes, Jr. | 709/231 |
| 2003/0067541 | A1 | 4/2003 | Joao | |
| 2003/0080713 | A1 * | 5/2003 | Kirmuss | 320/150 |
| 2003/0080878 | A1 * | 5/2003 | Kirmuss | 340/936 |
| 2003/0081121 | A1 * | 5/2003 | Kirmuss | 348/143 |
| 2003/0081122 | A1 * | 5/2003 | Kirmuss | 348/148 |
| 2003/0081127 | A1 * | 5/2003 | Kirmuss | 348/207.99 |
| 2003/0081128 | A1 * | 5/2003 | Kirmuss | 348/207.99 |
| 2003/0081934 | A1 * | 5/2003 | Kirmuss | 386/46 |
| 2003/0081935 | A1 * | 5/2003 | Kirmuss | 386/46 |
| 2003/0095688 | A1 * | 5/2003 | Kirmuss | 382/105 |
| 2003/0125854 | A1 | 7/2003 | Kawasaki et al. | |
| 2003/0154009 | A1 | 8/2003 | Basir et al. | |
| 2003/0220835 | A1 * | 11/2003 | Barnes, Jr. | 705/14 |
| 2004/0008255 | A1 | 1/2004 | Lewellen et al. | |
| 2004/0044452 | A1 | 3/2004 | Bauer et al. | |
| 2004/0054444 | A1 | 3/2004 | Abeska et al. | |
| 2004/0083041 | A1 | 4/2004 | Skeen et al. | |
| 2004/0088090 | A1 | 5/2004 | Wee | |
| 2004/0111189 | A1 | 6/2004 | Miyazawa | |
| 2004/0138794 | A1 | 7/2004 | Saito et al. | |
| 2004/0210353 | A1 | 10/2004 | Rice | |
| 2004/0254698 | A1 | 12/2004 | Hubbard et al. | |
| 2005/0099498 | A1 | 5/2005 | Lao et al. | |
| 2005/0100329 | A1 | 5/2005 | Lao et al. | |
| 2005/0136949 | A1 * | 6/2005 | Barnes, Jr. | 455/461 |
| 2005/0137796 | A1 | 6/2005 | Gumpinger | |
| 2005/0174217 | A1 | 8/2005 | Basir et al. | |
| 2005/0258942 | A1 | 11/2005 | Manasseh et al. | |
| 2006/0030986 | A1 | 2/2006 | Peng | |
| 2006/0047380 | A1 | 3/2006 | Welch | |
| 2006/0092043 | A1 * | 5/2006 | Lagassey | 340/907 |
| 2006/0095175 | A1 | 5/2006 | deWaal et al. | |
| 2006/0095199 | A1 * | 5/2006 | Lagassey | 701/117 |
| 2006/0259218 | A1 | 11/2006 | Wu et al. | |
| 2007/0132773 | A1 | 6/2007 | Plante | |
| 2007/0150138 | A1 | 6/2007 | Plante | |
| 2009/0043971 | A1 * | 2/2009 | Kim | 711/150 |

FOREIGN PATENT DOCUMENTS

| | | |
|---|---|---|
| EP | 1 170 697 A2 | 1/2002 |
| JP | 2002191017 A * | 7/2002 |
| WO | WO 99/40545 A1 | 8/1999 |
| WO | WO 01/23214 A1 | 4/2001 |

OTHER PUBLICATIONS

Written Opinion of the International Searching Authority for PCT/US2006/47055, Mailed Mar. 20, 2008 (5 pages).

Non-Final Office Action for U.S. Appl. No. 11/296,907, Mailed Mar. 22, 2007 (17 pages).

Drivecam, User's Manual for DriveCam Video System's HindSight 20/20 Software Version 4.0 (2003).

Rayner et al., Final Report for Innovations Deserving Exploratory Analysis (IDEAS) Intelligent Transportation Systems (ITS) Programs Project 84, I-Witness Black Box Recorder (Nov. 2001).

USPTO Non-Final Office Action for U.S. Appl. No. 11/296,907, mailed Mar. 22, 2007, 17 pages.

USPTO Final Office Action for U.S. Appl. No. 11/297,669, mailed Nov. 7, 2011, 15 pages.

USPTO Non-Final Office Action for U.S. Appl. No. 11/297,669, mailed Apr. 28, 2011, 11 pages.

* cited by examiner

MEMORY MANAGEMENT IN EVENT RECORDING SYSTEMS

FIELD OF THE INVENTION

The following invention relates to electronic storage of data. More particularly, the present invention relates to systems and methods for memory allocation and writing in devices recording vehicle events.

BACKGROUND OF THE INVENTION

Video recording systems are commonly used to monitor places where it may be desirable to monitor security levels. For example, in a security zone, breaches of security may be recorded if video monitors are arranged around the space to be monitored. When an incident occurs, a video record of the related activity is available from the recording system.

During periods when no breaches of security occur, a considerable amount of data is still generated by the video recording system, which has little or no value. Thus, such data can be readily discarded without loss. The act of 'discarding' data amounts to merely rewriting new data over old recorded data. Indeed, most video security systems are arranged with a recording medium that is reused continuously.

When a video camera generates an amount of image data sufficient to fully consume the available memory, newly collected data is recorded at the beginning of the memory. Therefore, the act of writing newly acquired data causes old data to be discarded; that is, the old data is lost to the 'write' operation of the newly collected data.

In old videotape systems, this is sometimes called a 'round robin' arrangement. A memory medium fashioned as a tape in a continuous loop provides data storage for those video security systems. In such systems the tape has no end and no beginning, but instead the tape continuously passes by a recording head where new images are written to the tape and at the same time old images are discarded.

When an incident of interest occurs, the tape may be stopped to prevent loss of data which relates to the relevant incident. The related images may be recovered from the tape and transferred to a permanent medium, while the tape is returned to the video system for further recording. Such reuse of memory is well known in the prior art.

In a round-robin scheme, the data that is overwritten, or discarded, is the data which came into the system earliest, or was 'first in' the system. This arrangement is sometimes referred to as "first-in, first overwritten," which is analogous to the "first-in, first-out" arrangement in electronic buffer systems. In both cases, we will refer to this method as FIFO.

A FIFO base system is generally a very good system for buffer management, because the oldest data in a buffer is typically the least valuable. Therefore, the oldest data, or the least valuable data, may be discarded without regard for its loss. However, in buffer systems the earliest received data, or the 'first-in' data, may not always be the least valuable data. In some instances it may be advisable not to overwrite the oldest data, but rather to provide an overwrite scheme which preserves certain portions of interest of the oldest data.

With specific reference to the monitoring of vehicle activities, vehicle event recorders are video recorder systems mounted within the vehicle to provide a video record related to the environment surrounding a vehicle during its operation. These systems are known in the art and are employed, for example, in conjunction with police activity. Many police departments in the United States are equipped with vehicle event recorders, which capture activity, sometimes criminal, occurring in the proximity of a police vehicle.

The application of vehicle event recorders is not limited to police vehicles. More and more commercial vehicles are now equipped with systems that record activity associated with the use of the vehicle and within the environments in which the vehicle is used. These systems are particularly advantageous with fleet vehicles that are subject to heavy professional use and frequent incidents, including traffic accidents, theft, and vandalism, among others. With a video record, vehicle fleet managers are better equipped to manage and control costs associated with operations of large vehicle fleets. Safety is improved, driver performance is improved, a better understanding of accidents is achieved, and other benefits are derived from the use of vehicle recorder systems.

Vehicle recorder systems are described, for example, in U.S. Pat. Nos. 6,389,340, 6,405,112, 6,449,540, and 6,718,239, all to Rayner. In general, these inventions relate to a small device mounted on the vehicle rearview mirror to capture video images of traffic incidents ahead of the vehicle.

In particular, the '112 patent discloses a system that includes a vehicle operator performance monitor, which records a video of the vehicle operator, and which may be used to determine how the operator's actions affect use of the vehicle.

The '540 patent instead is an event recorder mounted in a vehicle, which includes one or more wave pattern detectors for detection and recognition of a predetermined wave produced outside the vehicle, and for producing a trigger signal denoting the presence of the predetermined wave. In particular, a detective wave is a wave of the type produced by a police or fire department emergency vehicle. Detection of this wave triggers a capture function which stores video images a long-term storage memory.

The '329 patent includes a video recorder system having a one-way hash function to perform a validation function. This way, the integrity of the recorded video data can be protected.

Finally, the '340 patent teaches a recording system having a certain relationship between two different types of memory. A first memory is arranged to store video for the short-term and to transfer some of that stored video in response to a trigger event. Data from this short term memory is transferred to a more durable and long-term memory, and the short term memory is continuously overwritten in a scheme described by Rayner as "first-in, first-overwritten". This way, Rayner teaches the coupling of a high-speed, high-performance volatile semiconductor memory with a flashlight memory good for long-term storage of large amounts of data even when power is removed. As will be described in detail later, Rayner's first in first overwritten scheme necessarily creates a loss of important and valuable data.

While systems and inventions in the prior art are designed to achieve particular goals and objectives, these inventions also include limitations which prevent their use in more extended applications, and cannot be used to realize the advantages and objectives of the inventions taught hereinafter.

SUMMARY OF THE INVENTION

It is an object, of the present invention to provide high-performance memory allocation systems for vehicle event recorders.

It also is an object of the present invention to provide for set memory allowances and for extended recording periods.

It is a further object to provide memory overwrite schemes that provide a time dilation on either end of a recording period.

These and other objects of the present invention are accomplished by apparatus and methods for allocating memory in vehicle event recording systems that provide improved memory allocation and writing schemes to preserve data over extended time periods, thereby improving prior art devices and methods that cannot record events over a large time range when equipped with a memory of a predetermined size.

One difference between memory allocation of the present invention and the prior art can be seen in relation to time dilation, which may be applied on the extremities of discrete capture periods. In one embodiment, a memory of limited size is subject to an advanced managed loop memory allocation scheme and the rate of storage frame is adjusted throughout a predetermined capture time period. At the extremities of a time period, a frame capture process is subject to a reduced frame rate. In the proximity to an event of interest, or an 'event moment', the frame rate is increased to improve detail around that particular time, enabling a greater temporal range at the expense of temporal resolution. Losses in temporal resolution are however pushed away from the event moment and allocated to the extremities of the capture time period.

An overwrite scheme selects which frames are expired and subject to being discarded. At any random moment, video is continuously captured at a maximum frame rate. However, these frames are not stored into memory in a conventional first-in, first overwritten manner, but rather, these frames are added to the memory locations which are determined to be available in accordance with the overwrite scheme. Therefore, the oldest frames are not necessarily those that are overwritten. Quite to the contrary, an overwrite action may be applied to a frame which is newer than at least one other frame stored in the memory.

As a result, newly acquired frames are placed into memory in processes which necessarily cause older frames to be discarded. However, the newly captured frames are written to memory positions in an 'interleaved' fashion, whereby some of older frames are preserved. When a capture event occurs, data in the memory may be transferred to a more permanent storage. When data is transferred, a timeline is reconstructed. The recorded timeline is unique in that it contains various frame rates over the capture period. At both the beginning and at the end of the capture period, the frame rate is modest. At the point of greatest interest in the capture period, the frame rate is the highest. This throttling of frame rate provides for a memory of given size to accommodate a timeline of greater temporal extent.

BRIEF DESCRIPTION OF THE DRAWINGS

These and other objects and advantages of the present inventions will become better understood upon consideration of the following description, taken in conjunction with the accompanying drawings, in which.

DETAILED DESCRIPTION OF THE INVENTION

Figure 1:
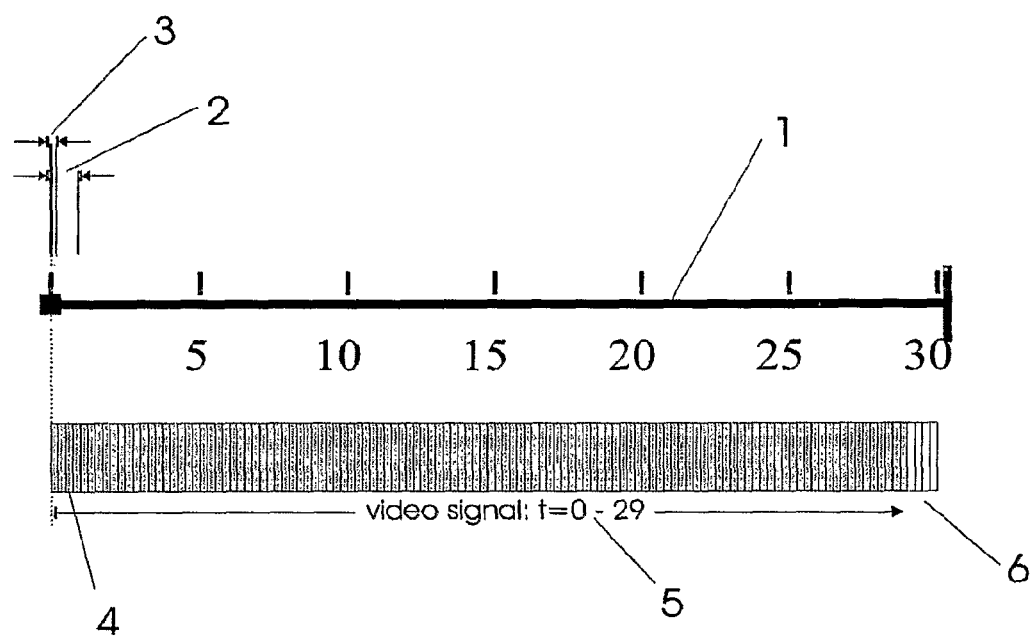
FIG. 1 is a timeline illustration in conjunction with a graphic that illustrates a plurality of memory bin units.

The present invention relates to apparatus and methods are provided for overwriting memory in vehicle event recorder systems. Embodiments are described hereinafter that are constructed in accordance with the principles of the present invention. In order to facilitate the understanding of the described embodiments, definitions are provided for terms that may not be readily available in popular dictionaries.

Vehicle Event Recorders: Video image recording systems which are responsive to triggers indicative of some event of interest.

Time Dilation: An expansion of a video sequence timeline by way of frame rate manipulation.

Trigger: Electronic means for setting some instant in time associated with a particular event of interest and further for causing initiation of some associative processes.

Expanded Timeline Definition: A prescribed set of rules which sets forth and defines a timeline associated with a video frames sequence having more than one frame rate associated with any particular portion of the timeline.

Overwrite Manager: A computer module determining, in accordance with an expanded timeline definition, which data recorded in memory and associated with a particular video frame is to be discarded and may be overwritten with data from a newly collected video frame.

Video event recorder systems are typically built around and deployed with memories of limited sizes, in order to contain cost. While mass storage and mass storage management may be included in such devices, for example, a computer-type hard drive, these types of components remains quite expensive, causing overall systems to double in cost if such memories were included. Instead, a 'lightweight' memory solution is envisioned in the present invention, in which an abbreviated memory or memory buffer is used to temporarily store information collected during a predetermined time of service, for example a day, of a vehicle equipped with this type of video event recorder. Upon return to base, a vehicle may transfer the information collected to a different memory for management and analysis. Accordingly, the present invention makes it possible to equip vehicles with video event recorders having very inexpensive cameras and memory.

Memories of such video event recording systems are preferably handled in the following manner. A memory system is divided into two portions: a fast, managed loop memory buffer, and a temporary mass storage memory.

Video continuously received from a video camera may be put into the fast memory buffer. However, the amount of data generated by a video system is quite extensive and most of the time totally uninteresting, but certain portions of the video may become of great interest. For example, when a vehicle is involved in a traffic accident, the captured video may yield important clues as to fault, cause, identity, and response, among others. In this event, it is important to preserve video data associated with these select video capture periods.

To this end, a trigger is arranged, whereby the occurrence of some incident of interest, such as an automobile accident, causes data stored in the memory buffer to be transferred to a more permanent memory facility. Old data in the memory buffer is continuously overwritten by new data received from the video camera in real-time. In common and simplistic versions, this step is performed in a "first-in, first-overwritten" manner.

Because the memory buffer is limited in its capacity to store video frames, "first in first overwritten" schemes provide a timeline of limited extent. For example, at a frame rate of four frames per second, a given memory buffer may be suitable for storing 30 seconds of video frame data, or a 30 second video timeline. In 'first-in, first overwritten' schemes, this timeline may be arranged as 15 seconds of continuous video before a trigger event and 15 seconds of continuous video after a trigger event.

However, a continuous frame rate throughout the entire event capture period need not be maintained. It is possible to have a modest frame rate at times associated with the capture period extremities, and a high frame rate during periods around an event trigger. Therefore, the storage frame rate may be adjusted throughout a prescribed capture time period, allowing for an extended temporal range. Instead of a 30 second timeline, is entirely possible to have a 48 second timeline for the same memory. Such a timeline may be embodied as 12 seconds of video at a frame rate of one frame per second for the periods of time furthest apart from the event trigger, both before and after. In addition, the video sequence may include video for 24 continuous seconds, 12 seconds before and 12 seconds after an event trigger, at a video frame rate of four frames per second. This way, the temporal range is extended but the temporal resolution is compromised in the time periods furthest from the trigger event.

To create such a managed loop memory buffer management system, an overwrite scheme is provided to select which frames are 'expired' and no longer part of the particular extended timeline scheme. It should be remembered that video is continuously captured at all times, and that video is captured at the maximum frame rate, because it is not known in advance when an event trigger will occur. Accordingly, the system always captures video at the maximum frame rate as the capture frame rate cannot be adjusted in view of any event trigger which may come in the future.

Video captured at the maximum frame rate is put into the memory and as it is put in the memory it displaces previously recorded video frames. These frames are added to the memory locations determined to be available in accordance with a prescribed overwrite scheme such as the one mentioned above. However, this step is provided differently from a first in first overwritten scheme. In the presently described embodiment, most frames being overwritten are actually newer than at least one other frame stored elsewhere in the memory buffer. Newly captured frames are written to memory positions in a pseudo-'interleaved' fashion while some of older frames are preserved.

When a trigger event occurs, data in memory is transferred from the memory buffer to a memory of more permanent nature. When such data is transferred, an expanded timeline is reconstructed as a timeline having at least two frame rates. At the extremities of the capture period timeline, the frame rate is reduced. At and about the point of greatest interest (trigger event) the frame rate is maximized during the capture period. This 'throttling' of frame rate provides for a memory of preset size to accommodate a timeline of greater temporal extent, although in some places resolution maybe reduced.

Referring now to FIG. 1, a first timeline is shown that is associated with a memory system divided into a plurality of memory bins. For exemplary purposes, some arbitrary numbers for memory size, number of bins, video frame rates, etcetera, have been selected. It is to be understood that these are not necessarily preferred values, but values selected to promote an understanding of the example provided.

The memory related to FIG. 1 is a high-speed, high-performance memory of limited extent, and is arranged as a buffer. This memory communicates with incoming video data recorded by a video camera, and its output is directed to another means for data storage means, such as a memory system having a greater capacity but lower speed, for example a semiconductor DRAM type memory. Alternatively, the memory of FIG. 1 may be a non-volatile, high-performance memory based on ferromagnetic principles, which can respond in real-time to video collected by a video camera, but is of limited size and not suitable for saving the mass amounts of data generated by video image systems.

In general, the memory of FIG. 1 may be limited to a few megabytes and may temporarily hold a limited number of video frames, which may or may not be transferred to a more permanent memory in a transfer operation. In particular, the memory may be divided into 120 bins, with each bin be sufficient for storing the data associated with a single video frame.

A timeline 1 is associated timeline 1 with this memory, and is comprised of a 30 second time interval. The timeline is marked in the Figure from 0 to 30. A one second interval 2 is illustrated at the beginning of the timeline. Further, that one second interval is divided into quadrants, representing a quarter of a second interval 3. For the video systems of immediate interest, this quarter of a second interval nicely accommodates a single video frame (implicitly setting a frame rate of four frames per second). While most modern video systems have far higher performance than recording four frames per second, four frames per second is a useful rate for vehicle recorder systems, which tend to have limited memories in the interest of maintaining a low cost. Further, the kinds of events being recorded in vehicle recorder systems are appropriately captured with frame rates of a few frames per second.

When video images are captured by a camera, frame-by-frame, each frame images can be recorded into a memory bin 4. A first frame is recorded and put into a first memory bin. Thereafter, a quarter of second later, a second frame is recorded and put into an another memory bin, for example, an adjacent bin. This frame-by-frame recording scheme may continue for up to 30 seconds before all memory bins becomes full and the supply of empty bins is exhausted. In FIG. 1, the first 116 memory bins are shaded to indicate that one frame each of video data has been written to those bins. This is equivalent to recording of a video signal 5 of four frames per second for 29 seconds. FIG. 1 also illustrates four empty memory bins 6, which would be filled in the next second of video recording. Because the recording of video images in this manner is known in the art, Figure a is labeled as prior art.

Figure 2:
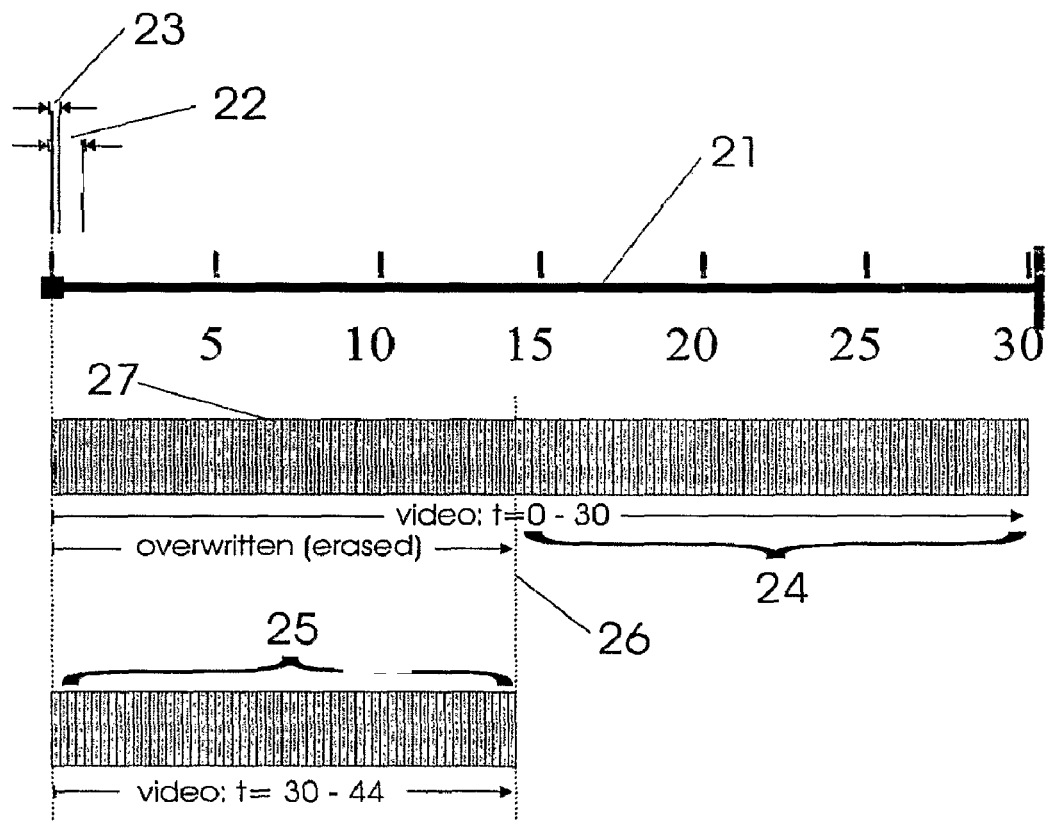
FIG. 2 is a timeline illustration and memory graphic illustrating an overwrite operation.

FIG. 2 illustrates a similar timeline 21 in conjunction with a graphical illustration of a memory having 120 memory bins. As in FIG. 1, a time interval equivalent to one second 22 as well as a time interval of one quarter second 23 is illustrated for reference. The graphical depiction of the memory includes lightly shaded areas 24 and 25. The memory bins presented as 24 represent those bins having data written thereto from a video which was collected from a time t=14 up to a time t=30. The demarcation indicated as dotted line 26 indicates time t=14. At time t=30, the memory is completely full. Video data collected for 30 seconds at four frames per second fills 120 memory bins. The video data collected at time t=31 cannot be saved to memory unless a portion of the memory already allocated and consumed in a previous data write step is overwritten. Thus, in the graphic of FIG. 2, memory bins indicated by 25 on a second line represent that video frame data that is recorded in these memory bins at the expense of data captured 30 seconds prior. Accordingly, for the time period indicated, i.e. video data collected from t=0 to t=14, that video data is lost to an overwrite step. In FIG. 2, those bins shaded dark are indicated as 27, representing the over-written bins. This illustrates the so-called 'round-robin' or 'first-in, first-overwritten' FIFO memory management schemes. Since these schemes are also known in the art, FIG. 2 is also labeled as prior art.

The FIFO memory management scheme is very useful. When a new video frame is collected by the video camera, it is placed into memory at the same location as the oldest frame in the memory which is discarded in the overwrite step. Therefore, the FIFO memory management scheme implies that the oldest video information in the memory is the least valuable.

The memory described is a buffer memory, that is, this memory temporarily holds the data of a video series for some specified time, but also continuously discards previously recorded information. When the buffer contains a data set associated with an important event, that data is transferred from the buffer memory to a more permanent memory before becoming subject to being lost by overwrite actions. A video series becomes 'important' when a detectable event occurs which implicitly indicates video is valuable; for example, if a vehicle is involved in a traffic accident, accelerometers can detect the accident and trigger a transfer of data from the buffer memory to a permanent memory.

In those vehicle event recorder systems, a trigger is sometimes arranged to indicate that such an event has occurred, that is, an event for which the video images associated therewith may be of extreme importance. In this case, the short term buffer memory of 120 video frames should be transferred to a more permanent long-term memory for example, a durable flash type memory.

Figure 3:
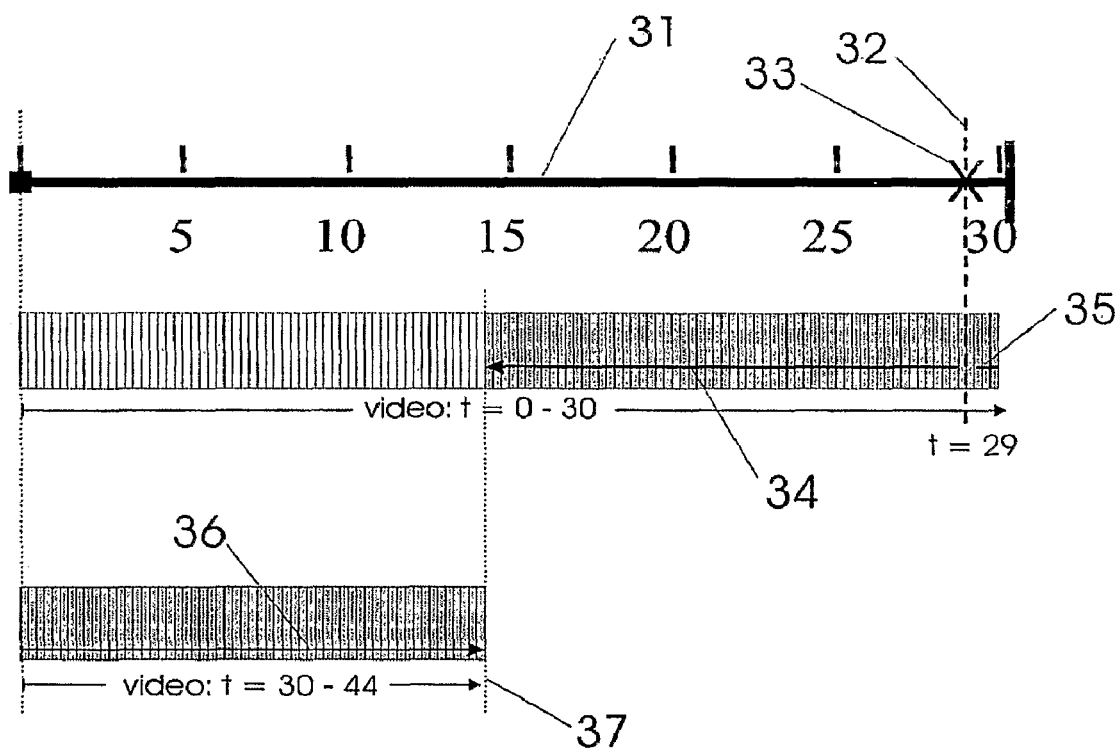
FIG. 3 illustrates the overwrite operation in conjunction with a trigger event.

FIG. 3 is directed at illustrating a timeline which includes an event moment. FIG. 3 includes a timeline 31, and the dashed line 32 to indicate the 29th second along with a marker 'X' 33 to indicate a trigger event has occurred at the 29th second. When a trigger event occurs, it is important to preserve the video data which occurred after the accident as well as the video data which occurred before the accident. Video images collected during a time period starting 15 seconds before the accident are in the bins indicated by 34; i.e. those video image frames collected between t=14 and t=29. Memory bins at the end of the time line indicated by 35 include four video frames collected during the first second after the accident. Video image frames collected between t=30 and t=44 are placed in the memory bins indicated by 36. Thus, the memory buffer contains video images for the 15 seconds prior to the accident and the 15 seconds after the accident. Because the memory is of limited size, it can only hold video image data which represents 30 seconds of video recording.

At this point in time, no new frames are recorded to memory; overwrite is prevented, and the memory buffer is "locked". Rather, the system pauses to transfer data in the buffer memory to a permanent flash memory. After data is successfully transferred to the flash memory, the buffer is "unlocked" and may be used again in the fashion described. As video data which was placed into buffer memory bins between time t=30 and time t=44, it caused older-data to be displaced, overwritten and forever destroyed. Data which was recorded between t=0 and t=14 is completely lost and no access is possible any more to this information, which at one time resided in those memory bins, because that information was destroyed in the overwrite step. However, some of this information may be very valuable and, accordingly, it is quite undesirable to lose it entirely; in fact, some of this data may be more important than data which saved in its place.

Since the moments leading to a vehicle accident can explain a great deal about the what actually happened, it is highly desirable to have at least some limited information that relates to the accident scene at t=1, for example. If one can just see one frame at t=1, that may be extremely valuable in explaining what happened in the accident. Therefore, the FIFO scheme may actually destroy critically useful data.

Figure 4:
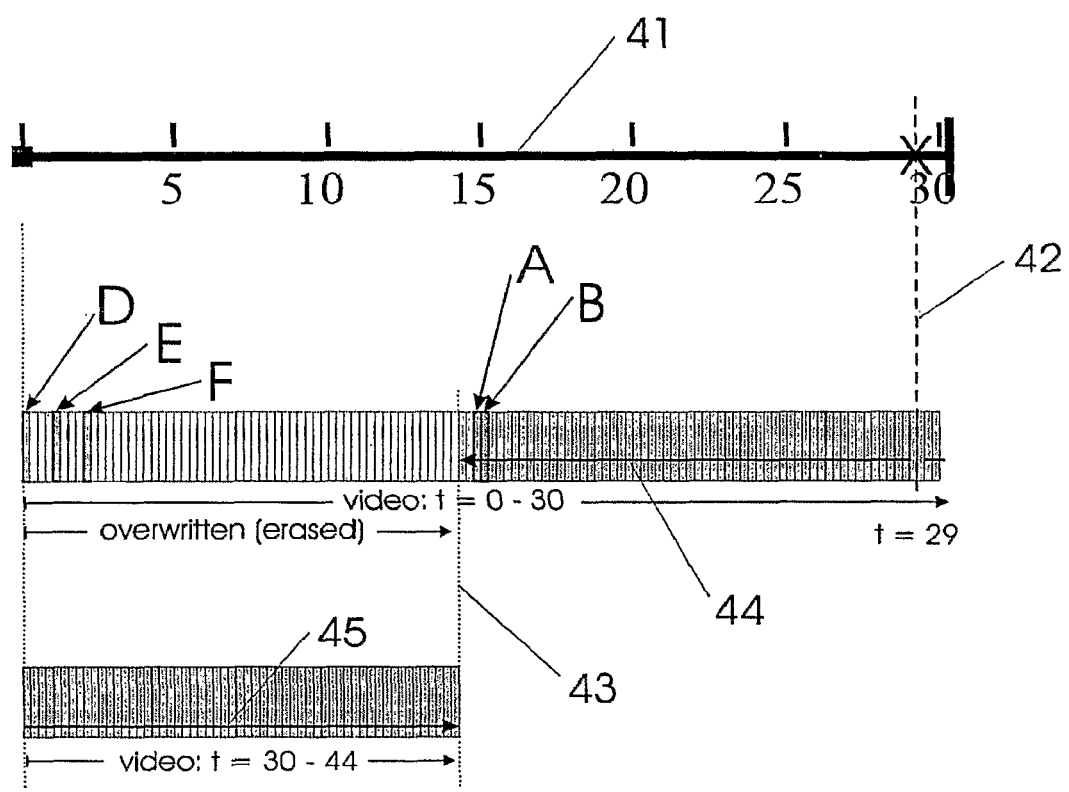
FIG. 4 illustrates particular memory bins with various levels of importance associated therewith.

This is also apparent from FIG. 4, which explicitly shows certain bins A-F associated with various points of the timeline 41 and with reference to trigger event 42 time at time t=29. The following discussion further illustrates the importance of bins A-F.

In a FIFO system, all memory bins, indicated by reference numerals 44 and 45, are preserved in the memory buffer. Amongst the oldest recorded video frames remaining are those which reside in memory bins A and B, and which represent two adjacent frames, or frames captured within a quarter of a second from each other. Since these frames represent images very close in time, these frames are expected to be quite similar to each other. While it is sometimes desirable in video systems to have high temporal resolution, i.e. as many frames per second as possible, one will appreciate that at higher frame rates, a frame will contain very similar information as the frame closest thereto. Accordingly, where memory is limited, these adjacent frames lose their importance as most of the information contained in each frame is similarly contained in the adjacent frame. Thus, if we keep frame A and discard frame B, most of the information of frame B can be known by examining frame A.

On the other hand, frames D, E and F, which are discarded in a FIFO system, may actually contain extremely important information. Frame D is separated in time from frame E by one second. In a video scene, there may be considerable differences between one frame captured an entire second later than another frame. Further, frame D occurs a full 29 seconds before the trigger event. In a traffic accident, it can be quite useful to know about what was happening at time periods before and after a trigger moment. Thus, it may be possible in a memory having a finite number of memory bins to trade some of the bins associated with less important time slots for bins associated with time slots having a greater importance. If we discard frame B, and preserve frame D, we may gain a greater overall understanding of the incident being recorded. In effect, we can trade some time resolution (frame rate) at t=15, for improved overall temporal range to realize an extended timeline.

One skilled in the art will notice that if video data associated with a frame rate of one frame per second was preserved, in seconds 1-12, then 36 memory bins into would remain available, which would accommodate newly captured video data. Thus, rather than completely overriding the oldest video data in memory, one can perform an overwrite action on 3 of every 4 memory bins in the overwrite portion of the timeline, thereby maintaining $\frac{1}{4}^{th}$ of the oldest video data in those memory bins. That is to say, for the oldest video data in memory, it may be useful to save one frame per second. To this end, when the overwrite operation is executed, new data is written to three memory bins, before one bin is skipped, and the process is repeated.

Timeline 51 includes a trigger event 52 at time t=29. In one overwrite scheme of interest, it is required that a timeline be comprised of 12 seconds of low temporal resolution, 24 seconds full temporal resolution and a further 12 seconds of low temporal resolution. This is further defined in detail as a 12 second period of one frame per second video, a 24 second period of four frames per second video, and finally a 12 second period of one frame per second; for a total video sequence of 48 seconds. Since it cannot be known at what time in the future an event trigger will occur, a data overwrite scheme must preserve data associated with various frames, of which a prescribed timeline is comprised. In the present example, continuous video data at a frame rate of four frames per second is preserved for a period of 12 seconds 54 before the trigger event; that data is in memory bins indicated by 53. While in the FIFO system one can preserve data at four frames per second for up to 15 seconds before and after the trigger event, in the system of the present embodiment only 12 seconds of four frames per second data be kept. However, it will be shown that the present embodiment enables the expansion of the total timeline of the video sequence to 48 seconds in contrast to the 30 second timeline of the FIFO system.

In the 31st second, the first overwrite operation begins. Whether or not a trigger has occurred, newly captured video data is written to every three out of four memory bins, leaving the fourth memory bin undisturbed. Therefore, old data is preserved, albeit at one quarter of the frame rate from which it was originally recorded. Video data after the trigger event is recorded in the memory bins 55 at a frame rate of four frames per second. Just because some bins are skipped, the frame rate of video data collected after the trigger event is not necessarily reduced. This is readily understood in consideration of the time point indicated by 57 which indicates the time t=41 seconds, while, without skipping bins, this point in memory would have been time t=45. Careful observation will prove that the bins indicated by 55 will accommodate data at four frames per second for the entire 12 seconds, after the event trigger.

Figure 6:
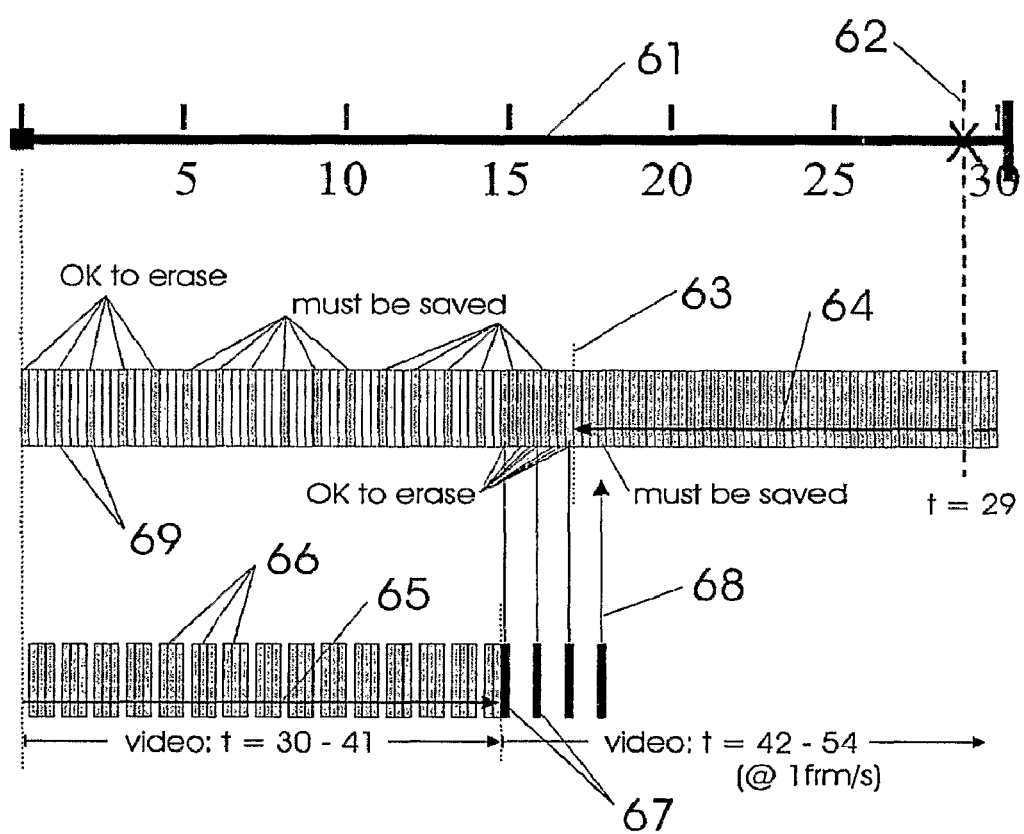
FIG. 6 further illustrates this overwrite scheme near the end of memory space.

After the time point indicated by 57, several memory bins remain available for further overwrite operation before reaching the memory bins which contain data to be preserved in agreement with the timeline definition 12/24/12. At least some of those memory bins up to the position indicated by 54 are available for overwrite. After the full 12 seconds of four frames per second video is recorded, it is desirable to continue recording video data at one frame per second for an additional 12 seconds. Data captured in this period can be stored in memory bins, which are scattered in various locations about the memory buffer. FIG. 6 illustrates on example of such locations.

More particularly, FIG. 6 illustrates memory bin locations which are available for overwrite as the memory approaches its full capacity for the particular schemes presented herein. Once a trigger event occurs, i.e. is set in time, it is possible to compute which video frames must be saved in accordance with the particular timeline definition, and which frames may be discarded. For example, 48 frames at four frames per second may be preserved immediately before the trigger event. In addition, 12 frames at a video rate of one frame per second may be preserved for the time t=5 up to t=17. These frames must be protected from any further overwrite operation, and are marked "must be saved" in FIG. 6. These frames are saved as they are included in the timeline definition.

All frames which precede t=5 are in condition for being discarded, that is, such frame lie outside the time range which is to be preserved. Accordingly, frames indicated for example as 69 have aged sufficiently and are may be erased. These are the frames which originally were preserved in the overwrite operation as skipped frames.

Video frames captured after the trigger event are also saved in the memory. For 12 seconds after the trigger event, t=29 to t=41, video is captured at a rate of four frames per second. Such a video data 65 is put into memory in accordance with the need to save particular frames of the oldest video data. When all video frames from the period t=29 to t=41 are properly recorded, the system continues to record data at the frame rate of one frame per second. This is different from the earlier operation, in which the overwrite action resulted in the preservation of one frame per second.

For the time period 12 seconds after the event trigger up to 24 seconds after the event trigger, data is put into memory at the reduced frame rate of one frame per second. Other frames may be captured by the camera, but are discarded before entering the memory or instantly thereupon. Thus, the frames represented by 67 are put into memory bins which are available in accordance with the "OK to erase" label in the drawing. A person skilled in the art will note that after three of these frames are placed in the memory, the fourth frame 68 cannot be placed into the memory in the same repeating geometric position. That is to say, those memory bins are not available for overwrite. Therefore, video captured after that time must be carefully managed and fit into the available memory bins.

Figure 7:
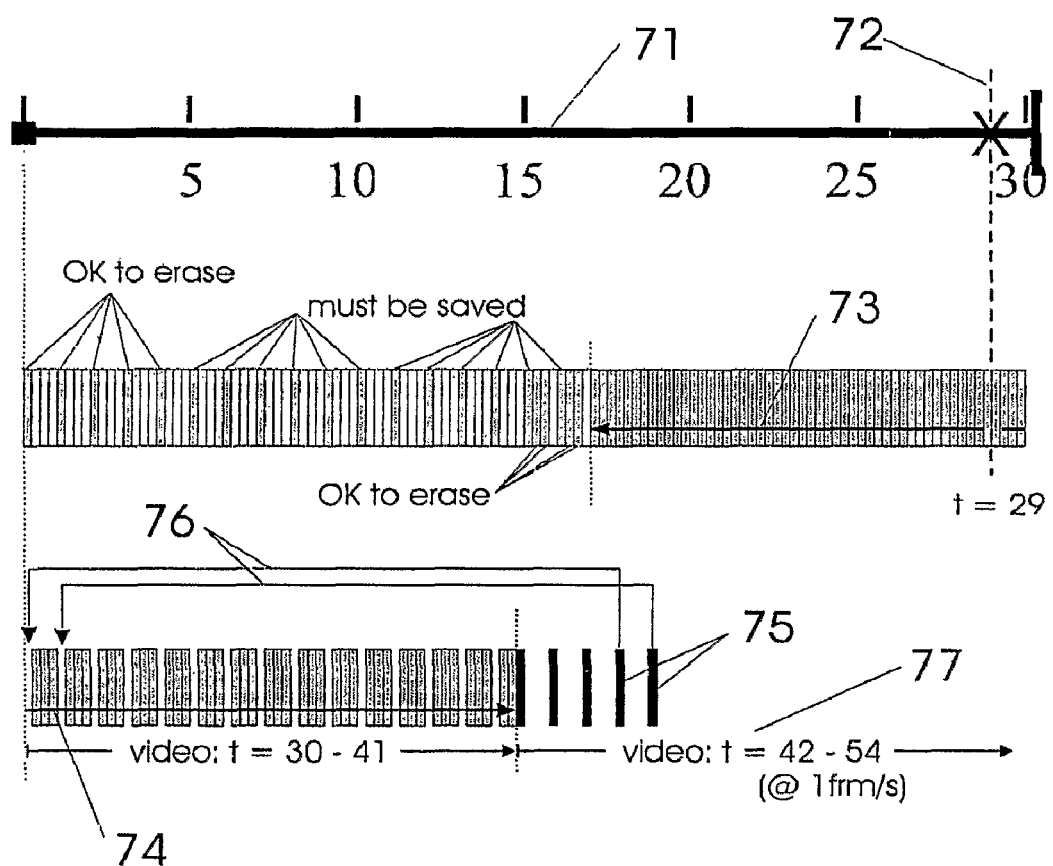
FIG. 7 illustrates memory allocation with pointers to memory bins to be saved and pointers to those bins to be erased.

FIG. 7 illustrates the steps taken in the final filling of the remaining memory bins. In timeline 71, event trigger 72 is situated at time t=29. In agreement with this exemplary timeline definition, video captured at a frame rate of four frames per second from t=17 to t=29 is stored in memory, as indicated by 73. Similarly, video captured for a 12 second period at a frame rate of four frames per second from t=29 to t=41 is stored in memory, as shown by reference numeral 74. Finally, video frames captured during a 12 second period from t=42 to t=54 at a frame rate of one frame per second include those particular frames represented as 75, which must be inserted into the memory bins remaining available for overwrite.

Arrows 76 indicate that these frames may be placed in locations near the beginning of the memory, where data had once been stored but is now expired because the trigger event occurs at t=29. Once a trigger event is established, the bins which may be overwritten can be determined according to the particular rules defining the timeline.

The example of FIG. 7 clearly illustrates that careful management of an overwrite scheme enables a memory buffer to dilate a timeline by manipulating which video frames are preserved and which are overwritten. Consequently, temporal resolution is sacrificed to extend temporal range, that is, the frame rate of "saved data" is altered in order to make more space available for video frames captured further in time from the event trigger. Accordingly, the greatest amount of information can be preserved in a memory buffer of the limited size.

While the example of FIG. 7 illustrates where the data may be written in memory, those skilled in the art will note that the physical positions of memory bins may be altered. Therefore, after a timeline definition is set, an algorithm may be developed defining the bins containing data that has expired and thus implicitly defining a bin available for overwrite at any moment in time.

Figure 5:
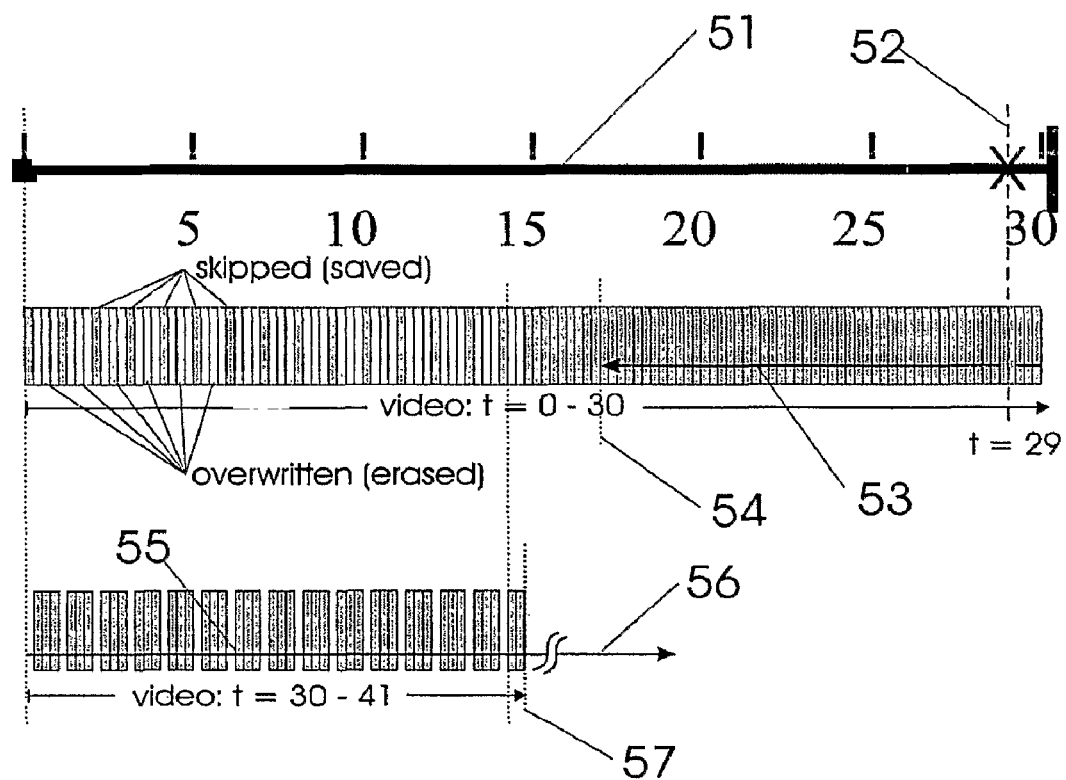
FIG. 5 illustrates an advanced overwrite scheme to protect certain 'high-value' video frames.

While the example presented of FIGS. 5-7 illustrates one possible solution, it should be understood that other arrangements may provide for a time dilation in accordance with the spirit of the present invention, and that specific values may be used that are different from those presented in the above exemplary timeline definition. In another exemplary timeline definition, one might arrange a system whereby two periods of eight seconds are used to capture video of a high frame rate, and two periods of 28 seconds are used to capture data at a low frame rate, thus achieving a total expanded timeline of 72 seconds.

The advantages offered by the above examples do not depend upon the particular values chosen in these examples. One should also recognize that because capturing/saving video at two different frame rates enables a user one to expand the timeline, capturing/saving video at three different frame rates also enables a user to expand the timeline with greater flexibility. Accordingly, the memory may be manages to preserve frames for some time periods at a rate of four frames per second, and in other time periods at a rate of two frames per second, and in still other time periods at a rate of one frame per second. This arrangement provides for very high temporal resolutions for the periods immediately surrounding an accident (trigger event), for medium level resolutions for periods further away from the trigger event, and finally for low temporal resolutions at the extremities of the time range.

Figure 8:
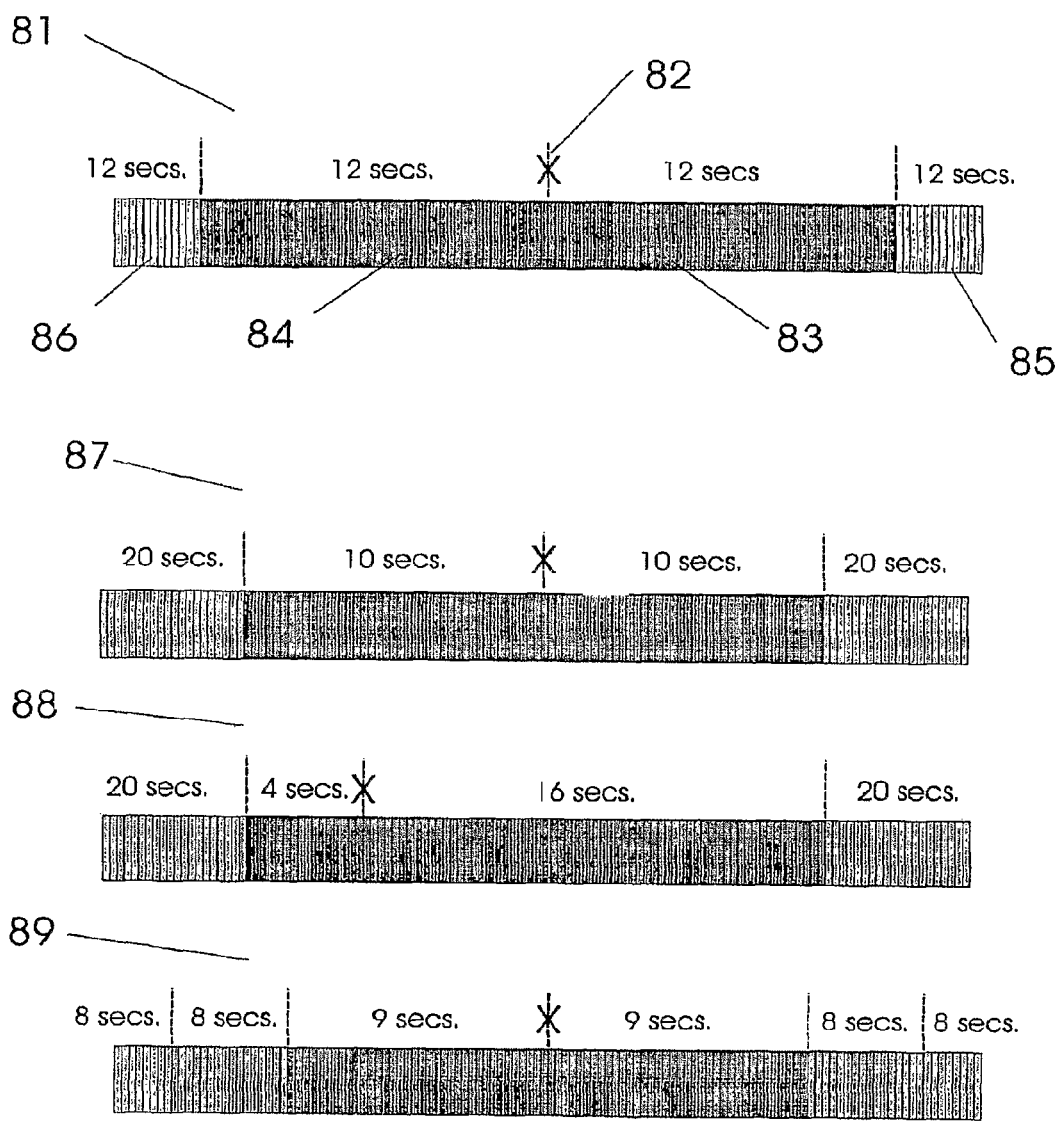
FIG. 8 illustrates four alternative timeline illustration in different embodiments of the invention.

In addition, asymmetric timeline definitions are possible, that is, the time periods on either side of the event trigger may not be equal in extent or in number. A timeline definition may be devised that has a long, high resolution period before the event trigger, and a short high resolution period after the event trigger. FIG. 8 illustrates various timeline definitions of interest, and is related to several examples each working equally well within the common concept of timeline dilation. FIG. 8 graphically illustrates a first memory buffer 81, which was discussed in detail in a previous example, and in which there are two frame rates, namely, a high video frame rate of four frames per second and a low video frame rate of one frame per second.

A trigger event 82 occurring at some instant in time implicitly sets the time periods for any particular example, and time period 83 starts immediately after the trigger event and extends for 12 seconds. A second time period 84 extends from the trigger event to 12 seconds prior to the trigger event. In both of these time periods, video is captured and put into the memory buffer at a rate of four frames per second.

The number of shaded memory bins reflects a frame rate of 4 frames per second. Time periods at the extremities of the timeline, periods 85 and 86, are each also configured to be 12 seconds in length. However, since only one frame per second is collected in those time periods, the number of memory bins consumed is considerably smaller, i.e. ¼ of those consumed in the other time periods. This arrangement provides for a total timeline of 48 seconds, and in memory buffers that do not overwrite/store data at variable rates, the same memory size could only accommodate a timeline of 30 seconds. FIFO memories of the same size are restricted to 30 seconds.

A second example presented as 87 in FIG. 8 suggests two high temporal resolution periods of 10 seconds each. In addition, there are two low temporal resolution periods of 20 seconds each. While there is a reduced overall period of high-resolution video data, the total timeline is extended to 60 seconds.

A third example is presented through the memory buffer of graphic 88, and illustrates that an asymmetric timeline definition may also be configured. The two periods with a high rate of video recording need not be the same in extent. In fact, video may be recorded at a high frame rate for a longer period after a trigger event than that in the period immediately preceding the trigger event. In the present example, video is recorded in the memory buffer for 16 seconds after the trigger event, but only for four seconds prior to the trigger event. Accordingly, the total high-resolution time period is the same as in the previous example, 20 seconds, but greatly favors preserving information after the trigger event, at the expense of information preceding the trigger event.

In a fourth example, there are six distinct time periods comprised in the timeline. Two 9 second periods occur symmetrically about an event trigger. In these time periods video may be captured at a rate of four frames per second. Two additional periods each of 8 seconds may be used to record/overwrite data at a frame rate of two frames per second. Two additional 8 second periods are provided to store data at a frame rate of one frame per second. One skilled in the art will appreciate that in the timeline of this example, two of the 8 second periods are of different sizes with respect to memory capacity, i.e. greater number of bins, than the other two 8 second periods. This is consistent with the higher frame rate used in two of the 8 second periods.

One skilled in the art will also appreciate the great latitude available for managing a memory buffer of limited capacity to expand a timeline. One skilled in the art will further appreciates that where memory buffers deploy FIFO or 'round-robin' strategies for overwrite operations, very important data may be lost. FIFO and 'round-robin' strategies discriminate against the oldest data in a memory buffer, and in situations where the oldest data is not the least valuable, FIFO and round-robin systems are inferior to the system of the present invention.

Figure 9:
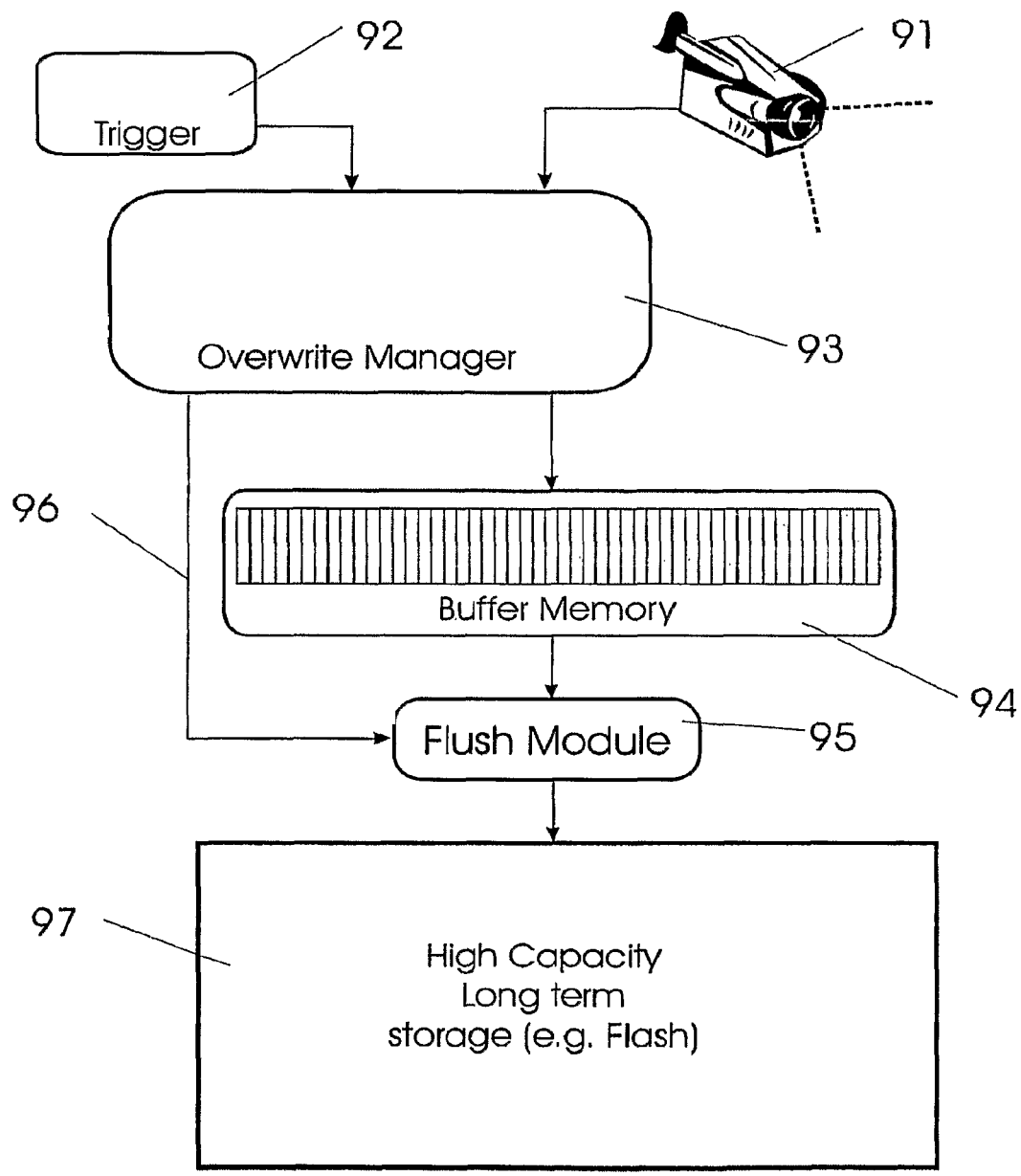
FIG. 9 is a block diagram of one embodiment of the invention.

Referring now to FIG. 9, the fundamental elements of apparatus according to the present invention is described. Video camera 91 is operable for collecting optical energy and for converting the image of a scene into electrical signals, suitable for processing by common electronic means such as digital semiconductor memories and processors. In addition, these systems include a trigger mechanism 92.

In one embodiment, a trigger mechanism is the device arranged to provide an electrical signal that indo indicates that a particular video series should be transferred to permanent memory for long-term storage. A trigger may be an accelerometer operable for detecting abrupt changes in speed, for example, speed changes related to a traffic accident. Triggers may be activated by other events such as heavy braking or swerving maneuvers, and may be activated by means other than accelerometers. For example, a user panic button can be used to activate a trigger event.

When the user believes that a video series should be saved, he can hit a panic button to activate one type of trigger. It is not relevant what precisely causes a trigger to be activated, but rather how memory performs once a trigger event has occurred. Overwrite manager 93 is a control module that interfaces with the trigger and a video camera, and also with a buffer memory 94. An overwrite manager includes means where a timeline definition may be set and further means for executing overwrite operations in agreement with the stored timeline definitions. Further, an overwrite manager may additionally integrate with flush module 95.

When a trigger event occurs, overwrite manager 93 continues to overwrite data to buffer memory 94 in accordance with the timeline definition, by way of an overwrite pointer which is associated with a cell subject to an impending overwrite action. Overwrite manager 93 sends a signal 96 to flush module 95 that cause flush module 95 to copy buffer memory 94 and to transfer the video data set with the prescribed expanded timeline to high-capacity long-term storage 97.

Overwrite manager 93 controls the algorithms and the necessary processing components for writing to buffer memory 94 and save selected data while purging redundant data in accordance with a particular expanded timeline definition.

Figure 10:
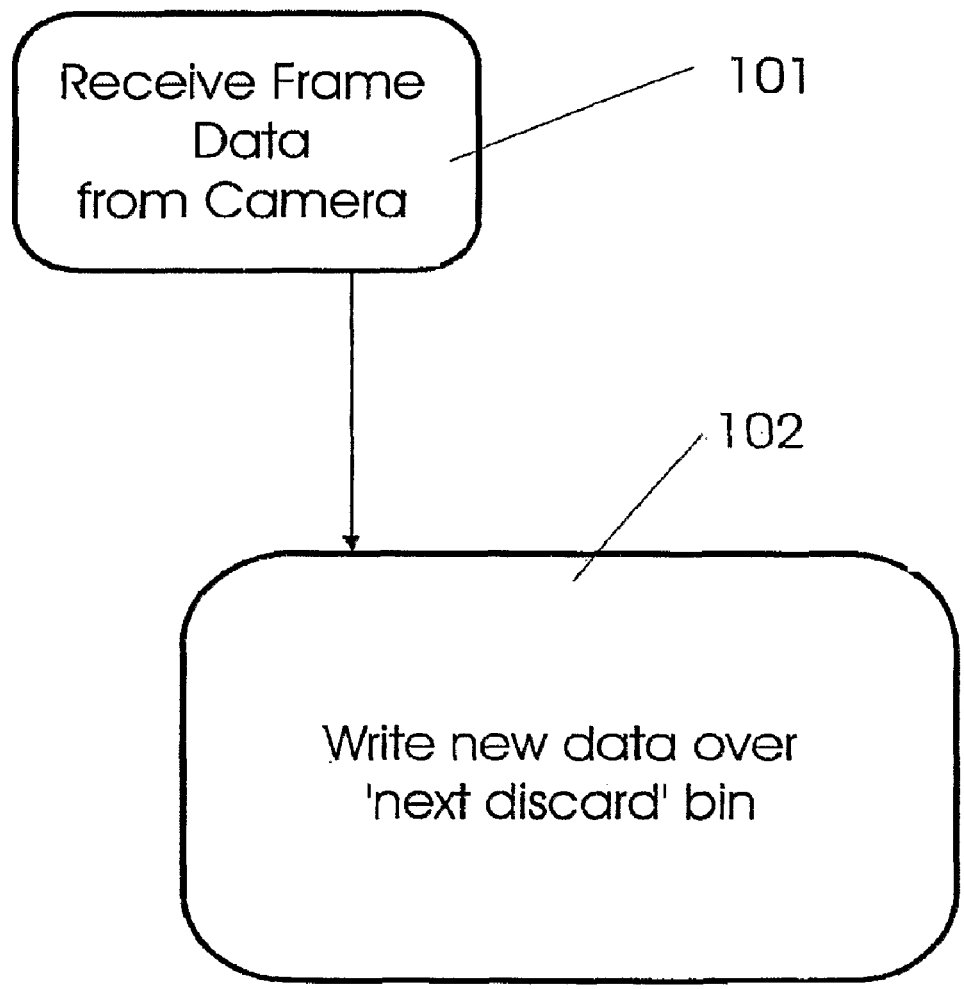
FIG. 10 is a block diagram representing an embodiment of a methods for memory management.
Figure 11:
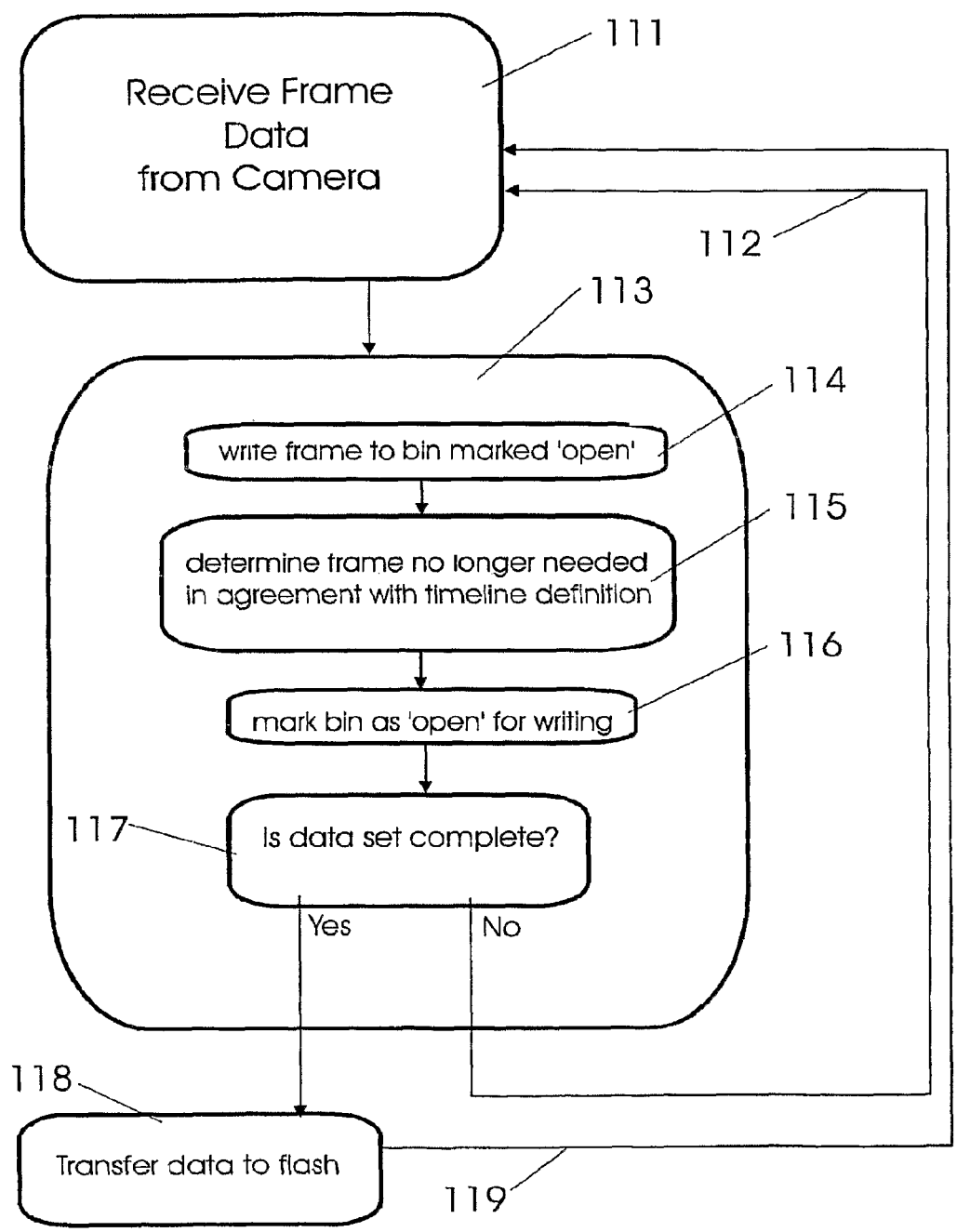
FIG. 11 is a more detailed block diagram of the method of FIG. 10.

FIGS. 10 and 11 which illustrate the primary steps of methods in accordance with the present invention. In particular, FIG. 10 describe such methods in the most general sense to include step 101, whereby frame data is received from a video camera, and step 102, whereby the newly received data is written over old data stored in the memory buffer according to an expanded timeline definition.

FIG. 11 illustrates these methods in greater detail. Frame data 111 is received from a video camera in a first step. Buffer memory data write step 113 includes sub-step 114, in which the frame is written to a bin marked open. It is important that data be written in the buffer memory in an organized fashion, without disturbing particular data frames, necessary to fill the prescribed expanded timeline definition. Therefore, a bin is marked 'open' when it no longer contains frame data necessary for the expanded timeline definition.

In second sub-step 115, a determination is made as to which memory bin contains frame data that is no longer needed in agreement with the timeline definition. This determination made during each cycle. For every new frame entering the buffer memory, another frame becomes no longer necessary at the same instant.

Finally, in third sub-step 116, the bin which contained data that is no longer required is marked 'open'. In following cycle 112, the next incoming frame is written to the appropriate bin. It is helpful to set a buffer memory pointer to direct the incoming frame to a bin marked 'open'.

One skilled in the art will appreciate that advanced memory management schemes may be deployed to expand a recorded timeline in memory buffers having limited capacity.

While embodiments of the invention have been described above, it will be apparent to one skilled in the art that various changes and modifications may be made. The appended claims are intended to cover all such changes and modifications that fall within the true spirit and scope of the invention.

What is claimed is:

1. A vehicle event recorder comprising:
a camera configured to obtain optical images and to convert the obtained optical images into electronic signals;
a managed loop buffer memory comprising a rewriteable, electronic storage medium of finite size and configured to receive the electronic signals from the camera and to store the electronic signals as discrete video frames;
an event trigger configured to generate a trigger signal; and
an overwrite device electronically coupled to the managed loop buffer memory and to the event trigger,
the overwrite device being arranged to manage data overwrite operations such that the managed loop buffer memory stores video frames in an interleaved fashion and increases a rate of video frame storage beginning at a first predetermined time before the trigger signal and subsequently decreases the rate of video frame storage after a second predetermined time following the trigger signal.

2. The vehicle event recorder of claim 1, wherein the overwrite device further is arranged to manage data overwrite operations such that the managed loop buffer memory overwrites video frames in an interleaved fashion by performing overwrite operations on alternate frames or frame sets.

3. The vehicle event recorder of claim 1, wherein the overwrite device further comprises an overwrite pointer arranged to point to a cell to be overwritten in a future overwrite action.

4. The vehicle event recorder of claim 1, wherein the overwrite device further comprises a timeline definition, which defines an expanded timeline and virtual frame rates and periods for those frame rates.

5. The vehicle event recorder of claim 4, wherein the timeline definition includes one timeline having first, second, third, and fourth periods and a timeline midpoint between the second and third periods, the first period being immediately before the second period, the third period being immediately after the second period, and the fourth period being immediately after the third period,
the overwrite device being arranged to manage data overwrite operations such that the managed loop buffer memory stores video frames at a lower frame rate during the first and fourth periods than during the second and third periods.

6. The vehicle event recorder of claim 4, wherein the timeline definition includes an asymmetry, and wherein the frame rate is different for the periods after the trigger signal than the periods before the trigger signal.

7. The vehicle event recorder of claim 1, further comprising a high capacity long-term memory coupled to the managed loop buffer memory.

8. The vehicle event recorder of claim 7, wherein the vehicle event recorder is configured to transfer stored video frames from the managed loop buffer memory to said high capacity long-term memory responsive to the trigger signal.

9. The vehicle event recorder of claim 7, wherein the transfer of data step resets the managed loop memory into an initial state and a new timeline is initiated.

10. The vehicle event recorder of claim 7, wherein the video frames transferred to the high capacity long-term memory are not overwritten in successive data transfer steps because the high capacity long-term memory includes capacity sufficient for a plurality of events.

11. A method of dilating a timeline of a video series in a vehicle event recorder, the video recorder comprising a managed loop buffered memory, the method comprising:
receiving video frames from a video camera;
receiving a trigger signal; and
storing the video frames in the managed loop buffered memory in an interleaved fashion and increasing a rate of video frame storage beginning at a first predetermined time before the trigger signal and subsequently decreasing the rate of video frame storage after a second predetermined time following the trigger signal.

12. The method of claim 11, wherein overwriting data in an interleaved fashion comprises skipping successive frames as to effect a reduced frame rate.

13. The method of claim 12, further comprising moving an overwrite pointer to a cell not a member of a timeline definition.

14. The method of claim 13, further comprising applying an overwrite operation to the cell associated with the pointer and further moving the overwrite pointer to another cell not part of the timeline definition.

15. A method of using a managed loop memory device of an event recorder system, the method comprising:
receiving at the event recorder system video frames from a video camera;
receiving a trigger signal;
associating each memory cell of a plurality of memory cells at the managed loop memory device with a corresponding single video frame;
associating an overwrite pointer with one of the memory cells; and providing at the managed loop memory device an overwrite manager, the overwrite manager comprising a timeline definition, the overwrite manager directing the overwrite pointer to be associated with a memory cell that no longer remains a member of the timeline definition, thus subjecting that memory cell to an impending overwrite action, the overwrite manager further increasing a rate of video frame storage in the plurality of memory cells beginning at a first predetermined time before the trigger signal and subsequently decreasing the rate of video frame storage in the plurality of memory cells after a second predetermined time following the trigger signal.

16. A method of using a managed loop memory device of an event recorder system, the method comprising comprising:

receiving at the event recorder system images from a video camera;

associating each memory cell of a plurality of memory cells at the managed loop memory device with a corresponding single video frame;

associating an overwrite pointer associated with one of the memory cells;

providing at the managed loop memory device a timeline definition, the timeline definition directing the overwrite pointer to be associated with a memory cell that no longer remains a member of the timeline definition, thus subjecting that memory cell to an impending overwrite action, the timeline definition comprising two 12 second periods of 1 frame per second and one 48 second period of 4 frames per second, either of the 12 second periods falling before and after the 48 second period.

* * * * *